(12) United States Patent
Ireland

(10) Patent No.: US 6,553,052 B1
(45) Date of Patent: Apr. 22, 2003

(54) SOLID-STATE LASER

(75) Inventor: Clive Lionel Michael Ireland, Rugby (GB)

(73) Assignee: Advanced Optical Technology Ltd., Basildon (GB)

( * ) Notice: Subject to any disclaimer, the term of this patent is extended or adjusted under 35 U.S.C. 154(b) by 94 days.

(21) Appl. No.: 09/688,583

(22) Filed: Oct. 16, 2000

(30) Foreign Application Priority Data

Dec. 16, 1999 (GB) ............................................. 9929789

(51) Int. Cl.[7] .............................. H01S 3/091; H01S 3/09
(52) U.S. Cl. ........................................... 372/75; 372/69
(58) Field of Search ............................. 372/75, 69, 40, 372/41, 39, 10, 99, 101

(56) References Cited

U.S. PATENT DOCUMENTS 5,157,683 A * 10/1992 Millar et al. ................... 372/75

FOREIGN PATENT DOCUMENTS

WO 90/15462 12/1990

OTHER PUBLICATIONS

Brignon et al, IEEE Journal of Quantum Electronics vol. 34 No. 3, Mar. 1998, Brignon et al, "Compact ND:yAG And ND:YVO$_4$ Amplifiers End–Pumped by a High–Brightness Stacked Array", Whole Document pp. 577–585.

* cited by examiner

*Primary Examiner*—Quyen Leung
(74) *Attorney, Agent, or Firm*—Douglas S. Rupert; Wildman, Harrold, Allen & Dixon (57) ABSTRACT

An optically pumped solid-state laser in which an oscillator and optical amplifier are pumped by a common laser diode pump, with the pump beam first pumping the optical amplifier and a residual pump beam transmitted through the amplifier pumping the oscillator. Such an arrangement permits the use of high power laser diode arrays with poor focusability beams to be used as the laser pump to produce high energy laser pulses at least an order of magnitude greater than provided by the prior art and greatly expands the applications of such a solid-state laser.

21 Claims, 6 Drawing Sheets

SOLID-STATE LASER

BACKGROUND OF THE INVENTION

1) Field of the Invention

The invention relates to a solid state laser pumped by a laser diode pump.

2) Description of the Related Art

Many scientific, medical, printing, ranging and industrial applications of small lasers require the laser to be reliable and efficient with high peak to average power ratio capability, and to be able to emit near diffraction-limited short-duration pulses in a controlled manner.

In U.S. Pat. No. 4,710,940 to Sipes (1987) and in U.S. Pat. No. 4,739,507 to Byer et al (1988) miniature continuous wave (CW) Nd:YAG solid state laser oscillators end-pumped by a discrete laser diode pump are disclosed. In these miniature lasers the output of a laser diode pump, typically having a power of 0.1–1W, is imaged or focused to a size similar to that of the $TEM_{00}$ mode size of the solid state laser oscillator, that is to a focus which may be ~50–200 $\mu$m in diameter. In this way, the $TEM_{00}$ mode (which gives the highest beam quality) is preferentially excited and caused to dominate the output of the solid state laser oscillator. Sipes teaches that, by concentrating the pump beam to a power density typically in the range 1–10 kW.cm$^{-2}$ within an oscillator crystal, the laser oscillator can be very efficient. In a paper entitled, 'Diode Laser End Pumped Neodymium Lasers: The Road to Higher Powers', (Proc Tuneable Solid-State Laser Conf, Paper TuC6, p134–6, May 1989, publ. Optical Society of America), Fields et al report achieving a laser diode pump to solid state laser optical power efficiency of up to 61% with this type of miniature laser oscillator using Nd:YVO$_4$ as the oscillator material. U.S. Pat. No. 5,410,559 (1995) and U.S. Pat. 5,577,060 (1996) to Nighan et al teach that higher power performance can be achieved with larger lasers pumped at higher power where a oscillator is sufficiently long (typically 100 mm) to correspond to a large $TEM_{00}$ mode size in an oscillator crystal, and where care is taken to mitigate beam degrading effects caused by a severe thermal load in the crystal oscillator.

Pulsed output can be achieved from miniature diode pumped laser oscillators. Microsecond laser pulses, typically in the range 1–500 $\mu$s duration, may be achieved by using quasi-CW laser pump diodes ie diodes that can repetitively emit power for periods up to approximately 500 $\mu$s. Nanosecond duration laser pulses can be achieved by adding a controlled optical Q-switch to a laser oscillator. Pulses shorter than 1 ns may be achieved by adding instead a passive Q-switch. In U.S. Pat. No. 4,761,786 to Baer (1988) the use of a miniature acousto-optic modulator as the Q-switch in a CW pumped laser is taught to allow use of a short solid state laser oscillator and to provide fast optical pulse dynamics. Baer teaches the production of pulses in the range 10–50 ns duration and of 10–20 $\mu$J energy from miniature oscillators using Nd:YAG and Nd:YLF as the laser crystal oscillators. In a paper entitled, Q-switching of a diode-pumped Nd:YVO$_4$ Laser Using a Quadrupole E-O Deflector (Appl Phys B, Vol 67, p267–70, 1998), Friel et al report operating a short laser oscillator (around 15 mm long) and the production of 10–20 $\mu$J pulses of 1–2 ns duration and of the order of 10 kW peak power. If short pulses are required, and synchronisation is not important, a simple fast passive Q-switch (which can be very small) can be used and the oscillator made even shorter. This typically results in the generation of sub-nanosecond microjoule pulses at kHz repetition rate. In a review article entitled, "Q-Switched Microchip Lasers Find Real-World Application". (Laser Focus World, August 1999, P129–36, PennWell Pub, USA), Zayhowski teaches that such lasers with a oscillator of only 0.75–1.5 mm length produce pulses of 0.2 ns duration and 141 $\mu$J pulse energy. The average output power was up to 120 mW with a maximum 1W laser diode pump power.

Figure 1:
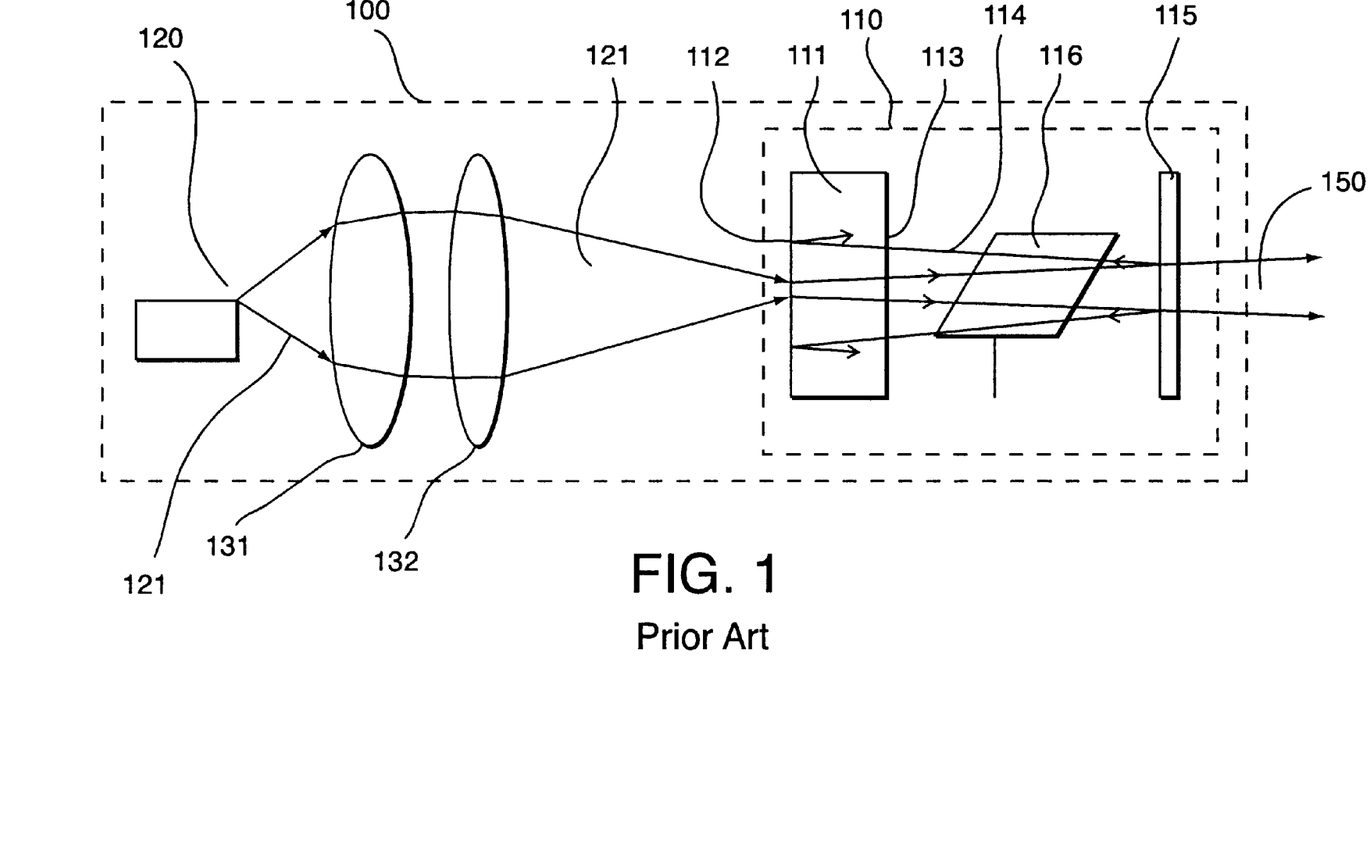
FIG. 1 illustrates an optical arrangement of a prior-art laser.

FIG. 1 illustrates a prior-art diode end-pumped miniature solid-state laser 100 including a Q-switched Nd:YAG solid state oscillator 110 that emits an output beam 150 at a wavelength of 1064 nm. In such a sold-state laser, a pump beam 121 from a discrete laser diode pump 120 operating at a pump wavelength of 808 nm is focused or imaged by lenses 131,132 onto an end face 112 of a Nd:YAG oscillator crystal 111 so that energy from the pump beam 121 is absorbed in the oscillator crystal 111 by exciting Nd ions. The crystal is typically a few millimetres in diameter and a few millimetres long. Stimulated emission of laser light occurs when the excited Nd ions are de-energised and the resultant light resonates in the oscillator by repeated reflections from the front face 112 of the crystal and a partially reflecting external mirror 115 to produce an oscillator beam 114 a proportion of which forms the output beam 150. To promote the reflections the crystal may have first and second high-damage-threshold dielectric coatings (not shown) applied to the face 112 illuminated by the pump diode and also to an opposed face 113 respectively. The first coating on face 112 is designed to transmit with low loss the laser diode pump beam 121 and to reflect the Nd:YAG oscillator beam 114, and the second coating on face 113 to transmit with low loss the oscillator beam 114. One or other or both of the reflecting surfaces comprising face 112 and that of mirror 115 may be curved to provide a stable oscillator. As illustrated, the laser oscillator 110 comprises in optical alignment, in addition to the miniature Nd:YAG crystal 111, and the partially reflecting output mirror 115, a miniature Q-switch 116 to allow the generation of laser pulses. The function of the Q-switch 116 is alternately to prevent and allow the oscillator 110 to resonate, so that while not resonating, increased energy is stored and on resonating, pulses of laser light are emitted.

When a quasi-CW pulsed pump diode 120 is used, the control of the diode and the Q-switch are synchronised. The laser output beam 150 exits the laser in the same direction as the pump diode beam 121 ie away from the diode 120. The principles of operation are well known to the art, and are, for example, described in 'Solid-State Laser Engineering' by Koechner W, Springer Verlag, N.Y., Fifth Edition 1999, p363–370.

As taught by Sipes, the pump beam 121 at the crystal face 112 must be of a size similar to the $TEM_{00}$ mode of the oscillator and have a power density of the order of 1–10 kWcm$^{-2}$ in the Nd:YAG crystal 111 to provide efficient operation. This restricts use of pump sources to discrete diodes. Since the work of Sipes, laser diodes have increased in CW power and diodes emitting 1–2W from a facet of approximately 100 $\mu$m×1 $\mu$m are commercially available. Thus the output beam 150 of this type of miniature laser is typically in the average power range up to several hundred milliwatts.

The above prior-art arrangements are now widely used fairly efficiently and controllably to produce microjoule pulses of some kilowatts power from solid state lasers. However, a significant disadvantage of their miniature design is that they are not scalable to much higher average power, or greater pulse energy or peak power. This is because:

i) the oscillator must be short (the shorter the better) to provide fast laser pulse dynamics and a short pulse, ii) the pump power must be low to avoid induced thermal distortion degrading the oscillator beam quality, and iii) for good beam quality, the pump beam must selectively pump the active crystal oscillator only in a small volume close to that of the $TEM_{00}$ mode.

As taught by Sipes, in a short oscillator, this last constraint requires high concentration of the pump beam for good performance. In particular, the constraints preclude use of higher power, larger area, laser diodes (or power diode arrays) because the output cannot be concentrated to a small spot corresponding to the $TEM_{00}$ mode of the laser oscillator.

Laser diode bars (or arrays of such bars) 10 mm long suitable for pumping solid state lasers are commercially available operating up to a quasi-CW pulsed power of 100W, and CW power of 40W or more (see for example OptoPower Inc, Tucson Ariz., USA product HO1-D040-mmm-CS data sheet). Schemes have been disclosed readily to concentrate the output of such laser diode bars to spots of typically 1–0.5 mm diameter, but not 100–200 $\mu$m diameter. Commercial devices are able to deliver 16W from a 20W-laser diode bar into a 0.6 mm spot with 0.37 numerical aperture (NA), but only of the order 1.2W power into a 100 $\mu$m spot. (See for example SDL Inc, San Jose, Calif. data sheets on products SDL-3460-P6 and SDL-2372-P3, respectively).

As a consequence of these limitations and others, it has not hitherto been possible to scale short pulse miniature laser diode pumped pulsed lasers to much higher pulse energy and average power.

It is an object of the invention to at least partially mitigate these disadvantages.

SUMMARY OF THE INVENTION

In accordance with a first aspect of this invention there is provided a solid state laser comprising an optical oscillator, at least one optical amplifier, a laser diode pump arranged to provide a pump beam common to both the optical oscillator and the at least one optical amplifier, wherein a portion of the pump beam from the laser diode pump is arranged to pass through the optical amplifier before pumping the optical oscillator.

Conveniently, the optical oscillator and the at least one amplifier are arranged to be end-pumped by the laser diode pump.

Advantageously, the portion of the pump beam is focused by focusing means onto an end face of the oscillator and the focusing means is provided with an optical path for an oscillator beam to pass from the oscillator to an end face of the amplifier substantially unaffected by the focusing means.

Conveniently, the focusing means comprises at least one lens and the optical path comprises an axial bore through the at least one lens.

Conveniently, first reflecting means are included to reflect some of the portion of the pump beam emerging from the amplifier back into the amplifier.

Preferably, the first reflecting means is a spherical mirror having a axial aperture for the passage of the portion of the pump beam focused by the focusing means onto the oscillator means.

Advantageously, a polariser and a quarter wave plate are located between the focusing means and the optical amplifier such that a linearly polarised beam from the oscillator transmitted through the polariser and quarter wave plate is converted to circularly polarised light before entering the amplifier, and a beam emerging from the amplifier and passing a second time through the quarter wave plate is linearly polarised in a direction orthogonal to the original oscillator beam, to be reflected by the polariser out of the laser.

Conveniently, the optical amplifier has a truncated conical shape for relaying the portion of the pump beam onto the oscillator.

Preferably, second reflecting means are provided between the amplifier and the oscillator to reflect some of the portion of the pump beam back into the amplifier.

Advantageously, the optical oscillator and optical amplifier have a common optical axis.

Conveniently, the optical oscillator includes a Q-switch.

Preferably, active materials of the optical amplifier and the optical oscillator are rare earth doped crystals and in particular the active materials are selected from the group consisting of Nd:YAG, Nd:YVO$_4$ and Nd:YLF.

Alternatively, active materials of the optical amplifier and the optical oscillator are rare earth doped glasses.

Conveniently, the active material of the optical amplifier is selected to be different from the active material of the optical oscillator.

Advantageously, the active materials are Nd:YVO$_4$ and Nd:YAG.

Preferably, the laser diode pump is a CW laser.

Alternatively, the laser diode pump is a quasi-CW laser.

Conveniently, the laser is adapted to output high-power pulses.

Advantageously, the high-power pulses have an energy greater than 100 microjoules.

Conveniently, the laser is adapted to output pulses of less than 500 microsecond duration.

Preferably the output pulses are of less than 10 nanosecond duration.

Conveniently, the laser is adapted to produce an output beam substantially in a $TEM_{00}$ mode.

In accordance with a second aspect of this invention there is provided a method of producing high energy pulses from a solid state laser comprising the steps of:

a) providing an optical oscillator and at least one optical amplifier;

b) providing a laser diode pump common to the optical oscillator and the at least one optical amplifier;

c) end pumping the at least one optical amplifier with the laser diode pump to produce a pumped optical amplifier;

d) end pumping the optical oscillator with the laser diode pump to cause the optical oscillator to emit a laser beam;

e) amplifying the laser beam with the pumped optical amplifier to produce an amplified laser beam; and f) outputting the amplified laser beam from the solid state laser.

The optical amplifier medium is typically in the form of a small rod with a polished barrel, but may be of other design. In a preferred embodiment, the optical amplifier is end pumped by a high power array of laser diodes using optics that efficiently couple the laser diode output beam into substantially the full numerical aperture of the amplifier. An aperture in a stop plate between the laser diode and optical amplifier is dimensioned such that a cone including most of the laser diode pump beam impinges within the numerical aperture (NA) of the amplifier, which guides and absorbs power from the laser diode beam so coupled. A substantial proportion of the residual pump power that is transmitted through the amplifier is coupled to a miniature laser oscillator crystal, typically by beam coupling optics. By this means, sufficient power is delivered in a small volume to enable the laser oscillator to be pumped and to operate in a low order mode, preferentially in the $TEM_{00}$ mode.

The laser oscillator is configured so that the output beam is emitted from the same end of the oscillator as that on which the incoming pump beam is incident. By this means, the emitted beam from the oscillator travels back through the amplifier in the contrary direction to the incoming pump beam and is amplified in so doing. Typically, the amplifier end faces (which may be planar or non-planar depending on the specific design) are anti-reflection coated at the output laser wavelength and the cylindrical barrel surface coated with an absorber at the output laser wavelength or other means used to mitigate parasitic oscillations and power loss. Conventional means are used to cool the amplifier via the barrel. A suitable choice of geometry and parameters allows the oscillator beam substantially to fill the amplifier aperture and efficiently extract stored energy absorbed from the pump beam. As a consequence, a high power pulsed output beam of high quality is emitted from the solid state laser. This beam is readily coupled out from the laser after amplification, eg by a dichroic mirror positioned between the diode pump source and the amplifier.

BRIEF DESCRIPTION OF THE DRAWINGS

In the drawings, like parts are designated by like reference numbers.

DESCRIPTION OF PREFERRED EMBODIMENTS

First Embodiment

Figure 2:
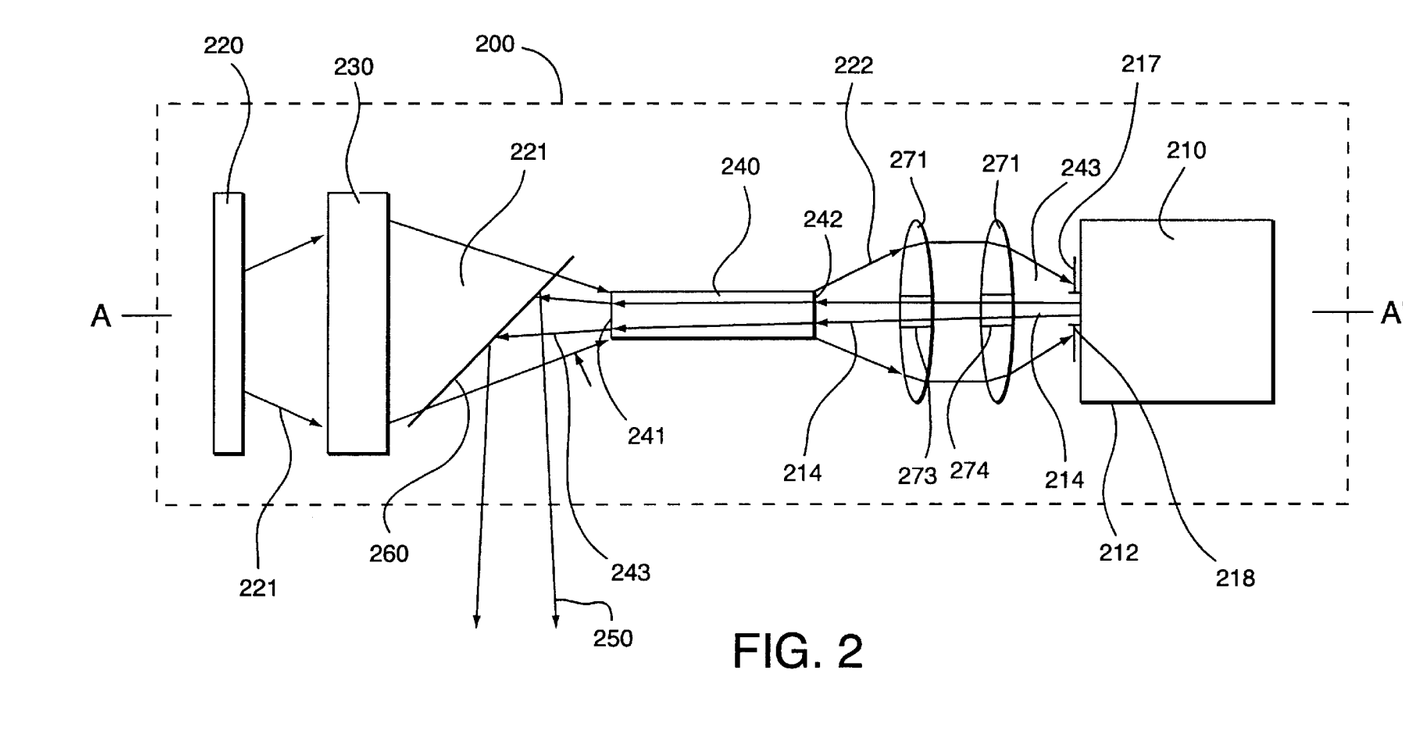
FIG. 2 illustrates an optical arrangement of a first preferred embodiment in accordance with the invention.

As illustrated in FIG. 2, a first embodiment of a laser 200 of the present invention comprises an optically aligned laser diode pump 220, an optical amplifier 240 and an optical oscillator 210. The optical oscillator may be any known optical oscillator and may, for example, have the same components as in the prior art of an optical Q-switch and external mirror. Located between the laser pump 220 and the optical amplifier 240 is an optical focusing system 230 and a dichroic mirror 260, the mirror 260 being inclined at an angle to the optical axis A–A' of the optical amplifier 240, such that light 221 emitted by the laser pump 220 may be focused by the optical focusing system 230 through the dichroic mirror 260 onto a first end face 241 of the optical amplifier 240. Between the optical amplifer 240 and the optical oscillator 210 are interposed focusing lenses 271, 272 for focusing light from a second end face 242 of the laser amplifer 240 opposed to the first end face 241 onto a first end face 212 of the optical oscillator 210. The first end face 212 of the optical oscillator 210 on which the light 243 from the optical amplifier 240 is incident is provided with a stop plate 217 having an aperture 218 to restrict the beam 243 to a central portion of the first end face 212. The focusing lenses 271, 272 between the optical amplifier 240 and the optical oscillator 210 are each provided with an axial bore 273, 274 respectively, for the passage of light 214 returning from the optical oscillator 210 through the focusing lenses 271, 272 to the optical amplifer 240.

The miniature oscillator 210 is different from the oscillator 110 of the prior-art illustrated in FIG. 1 in an essential respect. Dielectric coatings (not shown) deposited on the laser crystal (not shown) and mirror faces (not shown) are such that their reflectivities at the oscillator wavelength (1064 nm in the case of Nd:YAG as the laser material) are interchanged compared with the prior art devices. The dielectric coating on the first end face 212 of the oscillator crystal is made substantially 100% transmissive at the pump wavelength and partially reflecting at the laser wavelength. The coating on the second end face (or mirror, if used) is made substantially 100% reflecting at the laser wavelength. As a result, the oscillator beam 214 is emitted in the direction back towards the pump source 220 ie contrary to the direction in the prior-art device illustrated in FIG. 1. The oscillator beam 214 passes freely through the small axial bores 273, 274 in the oscillator residual pump beam coupling optics 271, 272 before entering the amplifier 240.

Both the miniature oscillator 210 and amplifier 240 are pumped with a beam 221, 222 from the single laser diode pump 220, the diode beam 221 pumping the amplifier 240 first and pumping the oscillator 210 using a residual beam 222 transmitted through the amplifier 240. An oscillator beam 214 emitted from the oscillator 210 is transmitted through and amplified by the optical amplifier 240 to form an amplified oscillator beam 243. The amplified oscillator beam 243 is reflected out from the laser 200 by the thin dichroic dielectric mirror 260, that is coated to substantially transmit the pump beam 221 and reflect the amplified beam 243 to form an output beam 250.

The configuration 200 has the key advantage of enabling the coupling of the output 221 of the high power laser diode pump source 220 with poor beam quality to the laser oscillator 210, whilst also giving high efficiency and simple construction. The invention provides for the majority of the pump beam 221 energy to be absorbed in the amplifier 240, and a controlled amount of residual power transmitted through the amplifier 240 to pump the oscillator 210. The ratio of the energy absorbed in the amplifier 240 and the oscillator 210 can be selected and is primarily determined by the geometry of the system, and the relative doping concentration of active ions in the amplifier 240 and oscillator 210 crystals. Under typical operating conditions, less than 1% of the active ions in an Nd laser amplifier are excited and, as a result, the amplifier absorption of the pump beam 221 in nearly constant. However, the ratio can be fine adjusted (if needed) via wavelength control of the diode source 220, since the diode wavelength is temperature sensitive. The diode wavelength typically shifts ~0.3 nm/° C. The range of wavelengths in the absorption spectrum of laser crystals is typically a few nanometres wide.

EXAMPLE 1

The first embodiment of the invention can be understood most easily by considering an example. Using $Nd:YVO_4$ as the material for the amplifier 240 and oscillator 210 typical parameters for the system may be calculated.

Nd:YVO$_4$ is a widely used, efficient laser material that can be pumped by laser diodes operating at ~808 nm to emit laser radiation at a wavelength λ1064 nm. It is known that a laser diode pump beam 221 of >1.5W focused into a spot of <200 μm diameter on an oscillator 210 with an Nd:YVO$_4$ crystal can produce a high quality TEM$_{00}$ mode beam at 1064 nm of up to 1W average power and of the order 150 μm in diameter.

The TEM$_{00}$ mode half angle beam divergence (θ) for the output from the oscillator is given by:

$$\theta \sim \lambda/\pi.\omega_o$$

where $\omega_o$ is the TEM$_{00}$ beam radius
Hence $$\theta \sim 5 \text{ mrad}$$

For convenient fabrication, the Nd:YVO$_4$ amplifier 240 is selected to be of the order of 10 mm long and 0.6 mm in diameter. In this case, the TEM$_{00}$ beam needs to be close to 0.6 mm in diameter on exiting the amplifier for good power extraction from the amplifier 240. In a case where the faces 241, 242 of the amplifier 240 are plane and normal to the optical axis A–A', the above oscillator beam divergence implies that the oscillator to amplifier distance must be of the order of 50 mm.

To meet the laser diode pump beam 221 requirements, an optimum solution is an optical arrangement 230 that is just able to focus the beam 221 into the full 0.6 mm amplifier aperture 241 as this provides the pump beam cone angle with the lowest possible NA. As noted above, prior-art shows that more than 75% of the power from a high power 10 mm long laser diode pump source can be readily focused into a 0.6 mm spot with 0.37NA. This allows at least 30W of power from a standard 40W laser diode pump source to be focused into the amplifier aperture 241 within a cone of 0.37NA. In this case the cone semi-angle (φ) is ~21.7° or less. ie the optical arrangement 230 need to be of f/no ~1.35, or faster.

Depending principally on the Nd active ion doping level in the Nd:YVO$_4$ amplifier 240 and oscillator 210 and the wavelength of the diode beam 221 emission, a proportion of the pump beam 221 is absorbed in the amplifier 240 whilst the beam is guided along and through the amplifier 240 towards the oscillator 210. The guiding nature of the barrel of the amplifier 240 ensures that a residual emerging pump beam 222 is also within a 0.37NA cone, or somewhat less since the rays more angled to the amplifier axis A–A' suffer a greater absorption path in traversing the length of the amplifier 240. Thus the first of the coupling lens 271 of focal length (f$_1$) between the amplifier 240 and oscillator 210 is selected to be of f/no ~1.35 to capture and efficiently collimate the residual pump beam 222. The subsequent focusing lens 272 is selected to be of focal length (f$_2$) that is as fast as practicable so as to deliver a small intense pump beam 243 for exciting the oscillator 210. Since small lenses with f/no ~1.0 are readily available, f$_2$ is taken to be of this value in this example. Thus the spot size of the pump beam 243 at the oscillator 210 is of the order 0.6×1/1.35~0.45 mm diameter.

A stop plate 217 having a circular aperture 218 of approximately 200 μm diameter is positioned in front of the oscillator 210 and transmits ~20% of the power of the residual pump beam 243. It follows that to deliver 1.5W pump power into the oscillator 210, the power of the incoming beam 243 needs to be ~7.5W. With 1.5W pump power, the oscillator 210 produces pulses of up to 50 μJ energy and up to 1W average power in a TEM$_{00}$ mode output beam 214.

In considering the residual pump beam coupling optics 271, 272 in the example, it has been assumed that the axial holes 273, 274 transmitting the oscillator beam 214 do not significantly affect the collection efficiency of the lenses for the residual pump beam 222. With an oscillator to amplifier distance of ~50 mm, the coupling optics 271, 272 lenses typically have focal lengths f$_1$ and f$_2$ in the region of 20 mm and 15 mm, respectively, therefore the lens of focal length f$_1$ will be of the order 20 mm from the amplifier. Over this distance the 0.37NA residual pump beam 222 grows from 0.6 mm to ~16 mm. ie a 1 mm axial hole through both lenses causes a loss of only ~1% of the residual pump beam power, and represents a negligible loss.

With 30W of power from the laser diode pump source 220 entering the 0.6 mm diameter amplifier, the input pump power density (P) is:

$$P \sim 30/\pi.(0.03)^2 \sim 10 \text{ kWcm}^{-2}$$

On the basis that 7.5W residual pump power is required to be transmitted by the amplifier 240, the amplifier absorption of the pump beam 221 is 22.5W ie 75%. In the case of a 10 mm long Nd:YVO$_4$ amplifier crystal, this corresponds to an absorption coefficient of ~0.14 mm$^{-1}$. As noted above, a crystal with the appropriate Nd absorption characteristic can be easily pre-selected.

At 22.5W absorption in the amplifier 240, the maximum small signal gain for the 1064 nm oscillator beam 214 is ~25, giving the amplifier a gain of 15 for 20 μJ oscillator input pulses and ~10 for 50 μJ input pulses. Therefore, in this example, the laser 200 illustrated in FIG. 2 produces TEM$_{00}$ output pulses of the order 0.5 μJ maximum energy. For CW diode pumping and operation at a 10–20 kHz Q-switch pulse rate, calculation indicates that this provides a system of the order of 5–10W average power. For optical pulses from the oscillator of nanosecond duration, the laser output pulses will be of peak power up to the order of 0.5 MW.

Second Embodiment

Figure 3:
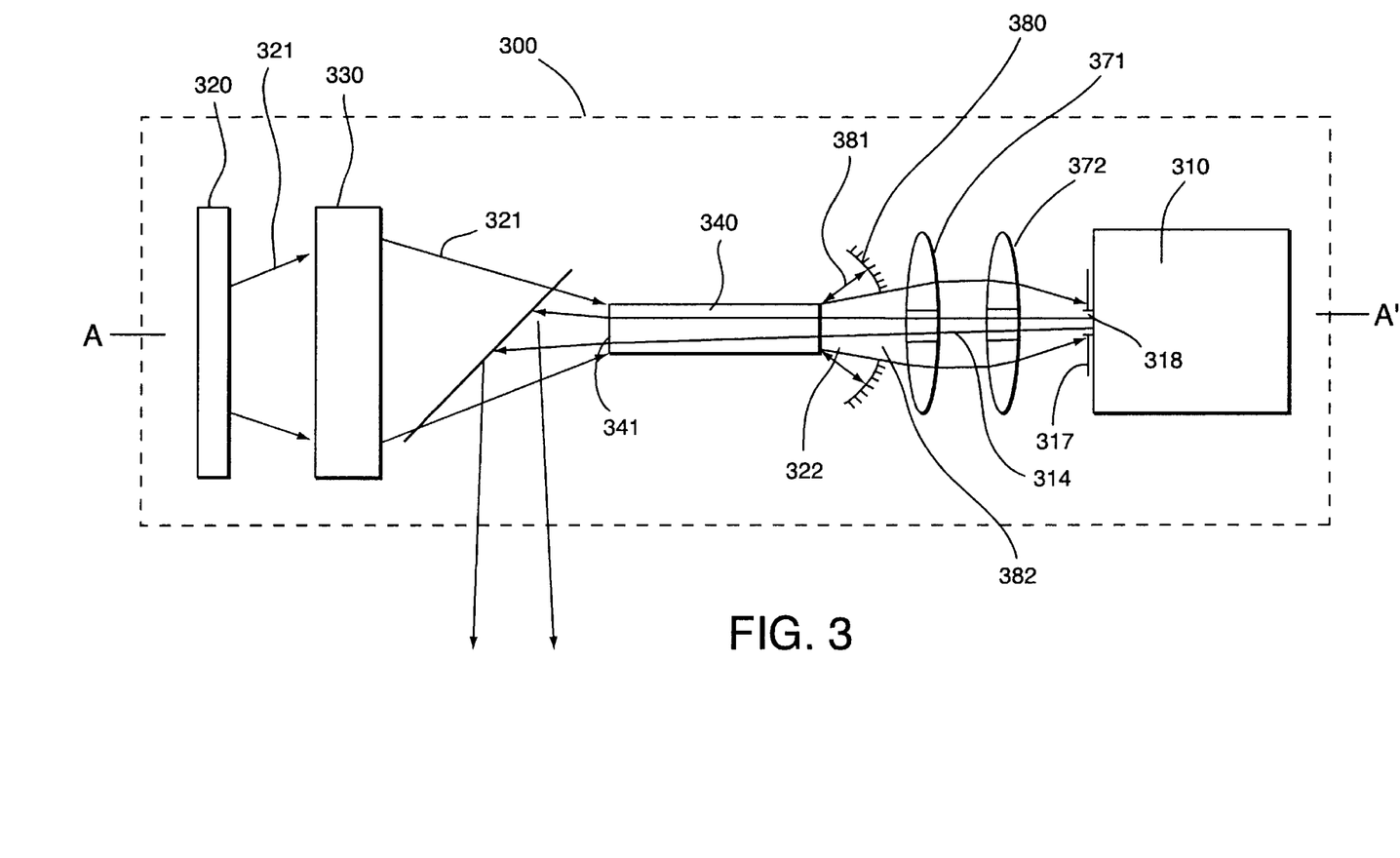
FIG. 3 illustrates an optical arrangement of a second embodiment in accordance with the invention.

FIG. 3 illustrates a second embodiment 300 of the current invention. This is similar to the first embodiment 200 illustrated in FIG. 2, but includes an additional concave mirror 380 interposed between the optical amplifier 340 and the coupling lens 371 to raise efficiency further when using a high power diode pump beam 321 of large cone angle. The mirror 380, of the order of 100% reflectivity at the pump wavelength, reflects a significant proportion 381 of the residual pump beam 322 back into the amplifier 340 where it can be further absorbed and add to the pumping of the amplifier 340. This reflected radiation 381 would otherwise be lost and not contribute to pumping the amplifier 340.

EXAMPLE 2

To help clarify the advantages of this embodiment 300, a second example is considered. Again, a laser 300 using Nd:YVO$_4$ as the oscillator 310 and amplifier 340 crystals is considered. The material has refractive indices of ~2.0 and ~2.2 in the ordinary (a-axes) and extra-ordinary (c-axis) crystal directions, respectively. As a result of these high refractive indices, a pump beam 321 with a cone angle much greater than 21.7° corresponding to a NA of 0.37 can be focused by an optical arrangement 330 into the amplifier aperture 341 and guided within the amplifier 340. This is practically important, because laser diode pump arrays 320 of power greater than 40W CW and 100W quasi-CW are readily available but have even worse beam quality than the lower power devices 120, 220 so far considered. As a result, the pump beam 321 from a high power diode array 320 is collected efficiently only by using a faster optical arrangement 330 which produces a larger pump beam cone angle φ to achieve a spot size compatible with the amplifier aperture 341.

In the case of a poorer beam quality pump source 320 with a large cone angle φ, the residual pump power 322 transmitted through the amplifier 340 will also exit with a large cone angle, similar to that of the input cone φ. In this case, a much-reduced fraction of the power will be within the required cone angle for collection by the residual pump beam coupling optics 371. 372 for efficiently pumping the oscillator 310. For example, use of a 100W laser diode pump source would result in approximately 20W in the residual pump beam, of which only ~5–10% is useful and needed efficiently to pump the oscillator. In the embodiment 300 illustrated in FIG. 3, the mirror 380 has an axial aperture 382 and is centred on the amplifier to oscillator optical axis A–A'. The aperture 382 freely allows transmission of the oscillator beam 314 but only partially transmits the residual pump beam 322. The radius of curvature of the mirror 380, the mirror position, and the mirror aperture 382 diameter are chosen to reflect the non-useful part 381 of the residual pump beam 322 back into the amplifier 340 to assist the amplifier pumping, thereby substantially raising the laser efficiency. In this example, the pump power absorbed in the amplifier 340 is increased from less than 60W to more than 75W due to the additional pumping facilitated by the mirror 380.

As a further method of enhancing the laser pumping efficiency, a stop plate 317 containing a small aperture 318 positioned and aligned in front of the oscillator 310 can be of optical quality and designed to be of the order of 100% reflectivity at the pump beam wavelength. Thus, with suitable alignment, pump power falling on the stop plate 317 (which power would otherwise be wasted) is back-reflected and a substantial proportion coupled back into the amplifier aperture to assist the pumping thereof.

Third Embodiment

Figure 4:
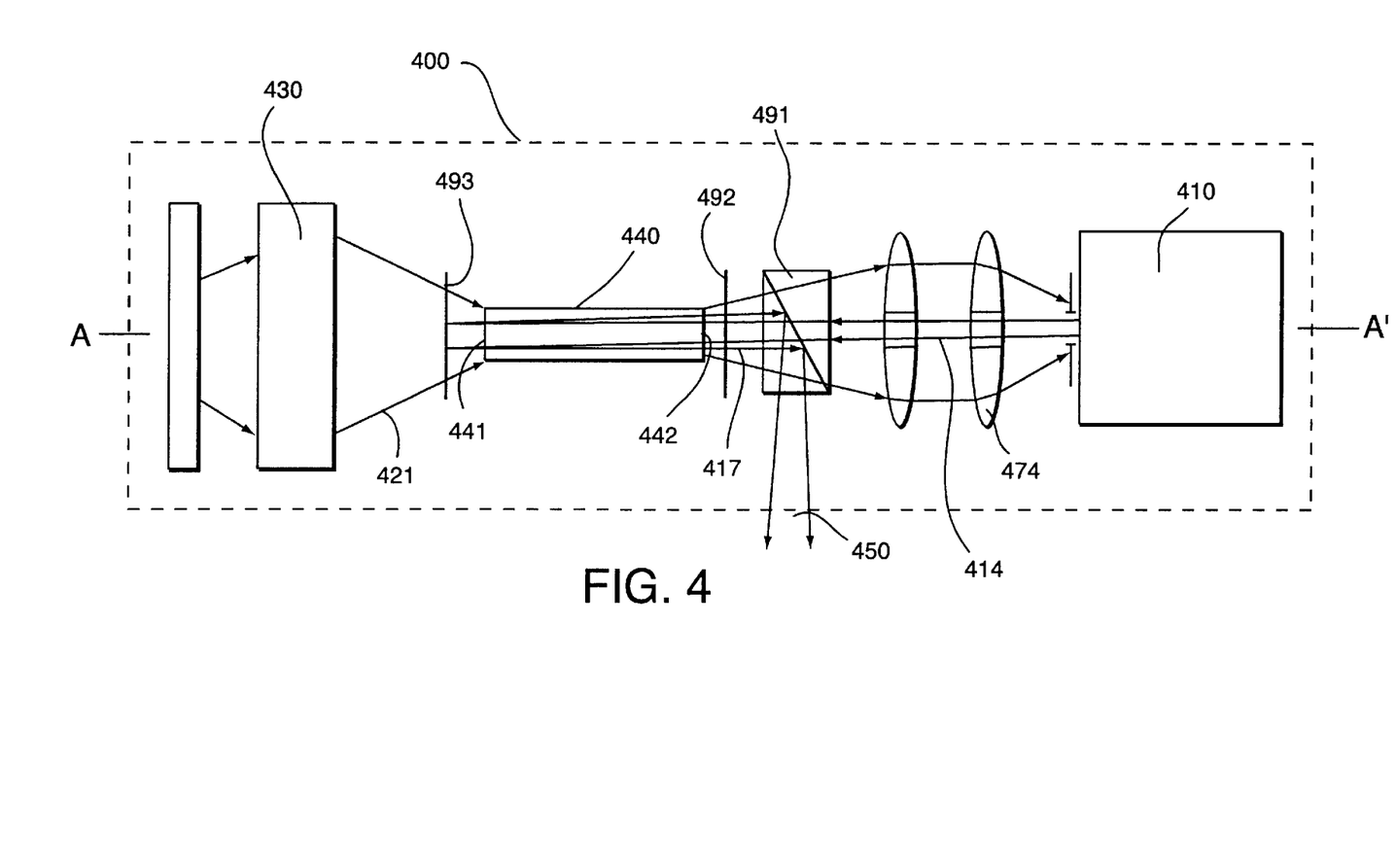
FIG. 4 illustrates an optical arrangement of a third embodiment in accordance with the invention.

FIG. 4 illustrates a third embodiment 400 of the current invention wherein an amplifier 440 is double passed by an oscillator beam 414 further to improve the power extraction and pulse energy, particularly for lower gain, longer storage time laser media such as Nd:YAG or Nd:YLF. In the case that the laser amplifier 440 and oscillator 410 comprise (say) Nd:YAG crystals, which are not birefringent in their conventional orientation, a simple arrangement of a defining polariser 491 and quarter waveplate 492 can be used to extract the double passed beam 417 after amplification. However, those skilled in the art will recognise that strongly birefringent laser materials such as Nd:YVO$_4$ and Nd:YLF, with different gains in different crystal directions, can equally well be used if, for example, the quarter waveplate 492 is replaced by a Faraday Rotator giving 45° rotation of the plane of polarisation of the oscillator beam 414, 417 each time the oscillator beam passes through it.

Referring to FIG. 4, a polarised 1064 nm beam 414 from the oscillator 410, transmitted by the polariser 491 and quarter waveplate 492, is converted to circularly polarised light before first entering the amplifier 440. A mirror 493 positioned and aligned between a laser diode pump optical arrangement 430 and the amplifier 440 is dielectrically coated to transmit substantially 100% of the pump beam 421, and to reflect back ~100% of the 1064 nm laser beam 414; returning the latter 414 back through the amplifier 440 and the quarter waveplate 492 to the polariser 491. On passing this second time through the quarter waveplate 492, the circularly polarised beam becomes linearly polarised in a direction orthogonal to the original input beam 414, and is substantially 100% reflected out of the laser 400 by the polariser 491. Thus the oscillator beam 417, having double-passed through the amplifier 440 exits from the laser 400 as an amplified output beam 450.

EXAMPLE 3

An example helps quantify the advantages of this embodiment. Consider an oscillator beam 414 of ~150 µm diameter and freely diverging with ~5 mrad divergence, using Nd:YAG as the laser material with the amplifier 440 chosen to be of the order 1.0 mm diameter and 10 mm long, and to have plane faces normal to the amplifier optical axis A–A'. In this case, the double-passed beam 417, from the oscillator 410 is arranged to be of the order of 1.0 mm diameter, and to fill the amplifier aperture 442 after the double pass. This occurs when the oscillator 410 to amplifier 440 distance is of the order of 60 mm. (If for some reason this distance is not convenient, it can easily be adjusted by choosing to make one or other of the amplifier faces 441, 442 curved.)

As for example 1 of the first embodiment 200 illustrated in FIG. 2, the pump power required for the oscillator 410 is of the order of ~1.5W in a spot <200 µt in diameter. Although the amplifier aperture 441 in this example of the third embodiment 400 is larger by ~67% than example 1 of the first embodiment 200, the pump beam 421 will have a reciprocal 67% smaller cone angle φ. The selection of a shorter value of the focal length $f_2$ for lens 474, results in a similar efficiency for pumping the oscillator 410 to that in example 1.

Using again the value of 30W pump power entering the amplifier 440, the maximum power density (P) at the amplifier is:

$$P \sim 4 \text{ kWcm}^{-2}.$$

On the basis that 7.5W residual pump power is required to be transmitted by the Nd:YAG amplifier, the amplifier absorption of the pump beam is 22.5W ie 75%. Also again, for the 10mm long amplifier crystal, the absorption coefficient is ~0.14 mm$^{-1}$, which can be achieved by a proper choice of the Nd:YAG crystal doping and pump wavelength.

At 22.5W absorption in the amplifier, the maximum double pass small signal gain for the 1064nm Nd:YAG oscillator beam is again ~25, giving the amplifier a gain of 22 for 20 µJ oscillator input pulses and ~20 for 50 µJ input pulses. As a consequence, the laser 400 produces TEM$_{00}$ output pulses of the order of 1.0 mJ maximum energy, and up to 5–10W average power under CW diode pumping and at a Q-switch pulse rate in the range 5–10 kHz. Where the pulses from the oscillator 410 are of nanosecond duration, pulses of peak output power up to the order of ~1 MW are achieved from the laser 400.

Fourth Embodiment

Figure 5:
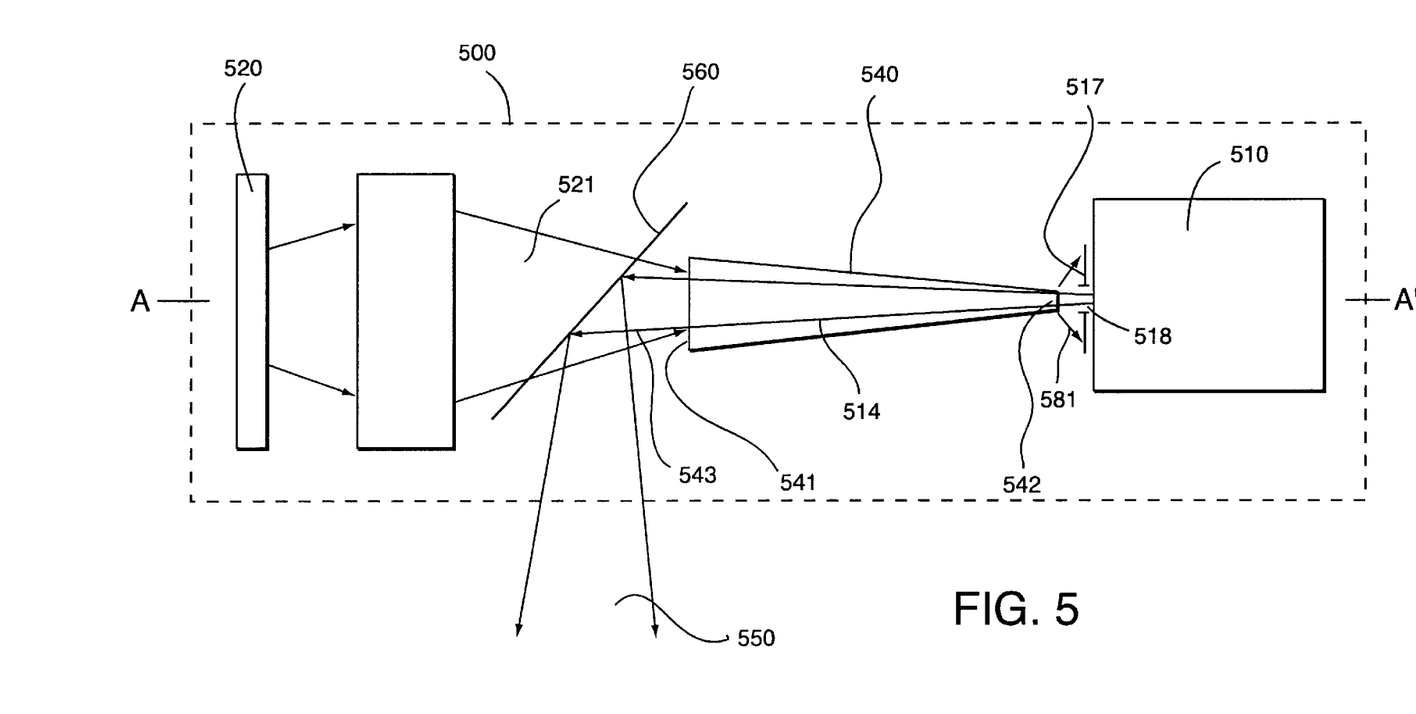
FIG. 5 illustrates an optical arrangement of a fourth embodiment in accordance with the invention.

FIG. 5 illustrates a fourth embodiment 500 in which residual pump beam coupling optics between the amplifier 540 and oscillator 510 are eliminated. The amplifier 540 has a truncated cone geometry with both end faces 541, 542 normal to the amplifier optical axis A–A'. An aperture of the amplifier at the end face 542 adjacent to the oscillator 510 is of a size similar to that required for the oscillator pump beam. An aperture of the amplifier at an end face 541 nearer to the pump source 520 is larger so as to allow easy coupling in of the pump power. As in the previous embodiments described in relation to FIGS. 2–4, the pump power is guided and transmitted within the amplifier 540 and a proportion absorbed therein. The residual power transmitted through the amplifier 540 is used to pump the oscillator 510 which, for convenience, is located in close proximity to the amplifier 540. To prevent the residual pump power 581 that exits the amplifier at large angles reaching the oscillator 510 and pumping outside the required mode volume, a suitable stop plate 517 having a small aperture 518 is positioned between the amplifier 540 and oscillator 510.

To ensure efficient filling of the amplifier 540 by the oscillator beam 514, the smaller optical face 542 of the amplifier 540 is concave to the oscillator beam so that the beam 514 within the amplifier 540 substantially fills the increasing amplifier diameter as the beam propagates. At the amplifier exit, the optical face 541 is plane, or conveniently, can be of suitably convex radius if a substantially collimated output is required. As in the case for the embodiments of FIGS. 2 and 3, a simple optical device such as a suitable dichroic mirror 560 provides for the amplified beam 543 to be efficiently extracted from the system as the laser output 550.

EXAMPLE 4

As for the previous embodiments, a simple example illustrates the advantages of this embodiment 500. Consider a laser medium of Nd:YVO$_4$ and 40W as the power of the pump source 520. The amplifier 540 is 10 mm long, and of the order 0.6 mm and 0.2 mm diameter at its two end faces 541 and 542, respectively. Using a laser diode pump beam 521 of cone semi-angle Φ~21.7°, calculation shows that the cone semi-angle becomes ~10° after entering the amplifier, increases to ~30° by the time the beam 514 has propagated to the smaller end 542 of the amplifier 540, and increases up to ~90° on exiting the amplifier. The proportion of this residual pump power entering the oscillator 510 via the aperture 518 of the order of 200 μm in diameter, is determined by the amplifier to aperture distance. Where the distance is similar to the aperture size, the fraction will be ~20%, and (again) approximately 7.5W of residual power will be enough to provide up to 1.5W to pump the oscillator 510.

For the oscillator beam 514 to fill the amplifier aperture, the radius of the concave input face 542 will be of the order of 3 mm. If a collimated amplified output beam is chosen, the radius of the amplifier exit face 541 will be convex and of the order of 8 mm. As is well known in the art, the chosen values may also be selected to include compensation for thermal lensing in the amplifier 540 attributable to power absorbed from the pump beam 521.

To obtain of the order of 7.5W residual pump power, the amplifier absorption of the pump beam 521 is again 22.5W ie 75%, and, with a proper choice of the Nd:YVO$_4$ crystal doping and pump wavelength, the laser 500 performance will be similar to that for the embodiment 200 illustrated in FIG. 2.

Fifth Embodiment

Figure 6:
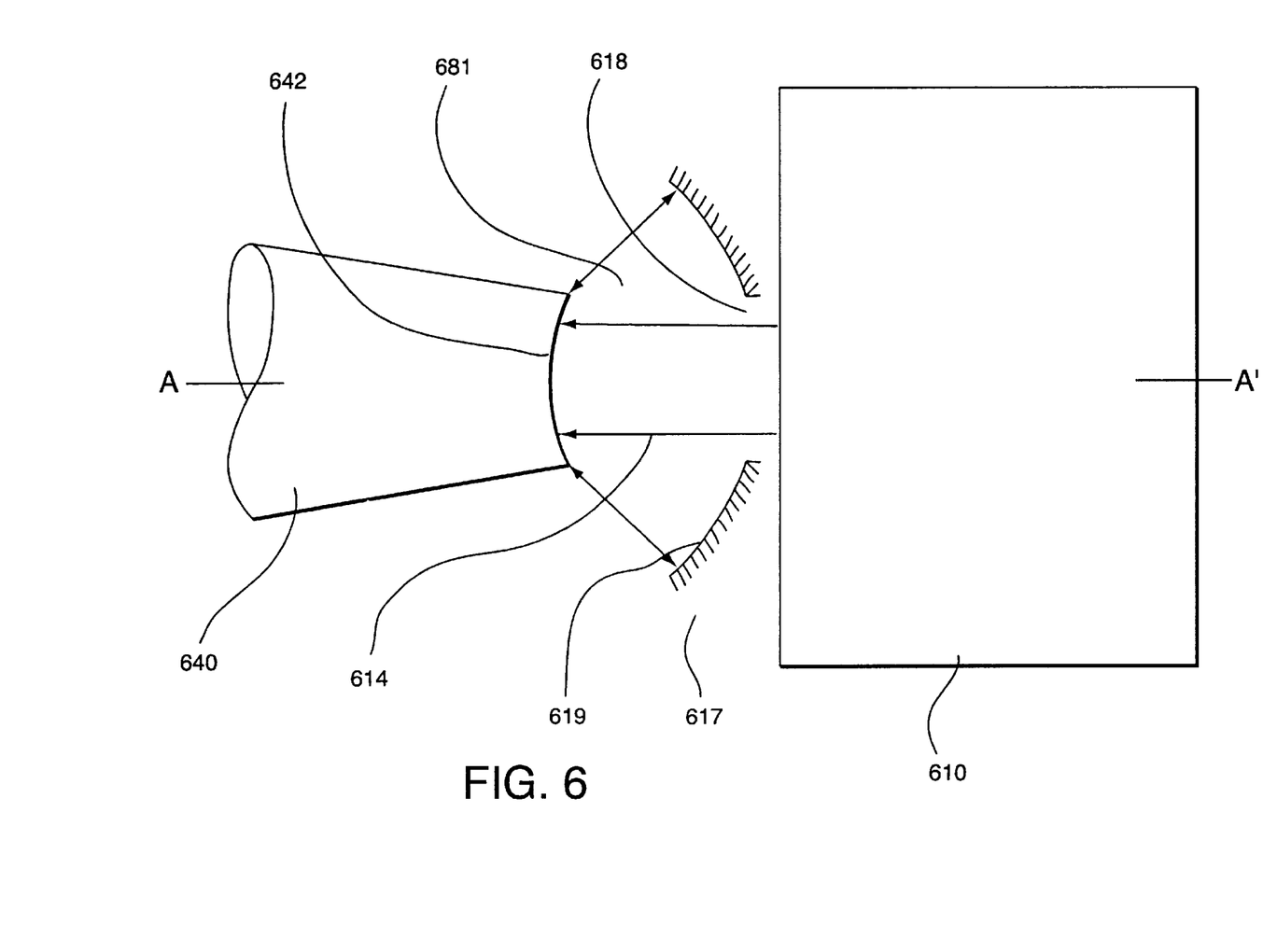
FIG. 6 illustrates an optical arrangement of a fifth embodiment in accordance with the invention.

The embodiment illustrated in FIG. 6 includes a modification of that shown in FIG. 5 to recover a significant proportion of the pump power 681 transmitted by the amplifier 640, that would otherwise be wasted. FIG. 6 shows the essential detail illustrating how this can be achieved.

As for the second embodiment 300 illustrated in FIG. 3, a concave mirror 617 having a small aperture 618 adjacent to the oscillator 610 comprises an optical surface 619 of the order of 100% reflectivity at the pump beam wavelength. The miniature mirror 617 has an axial aperture 618 and is centred on the amplifier 640 to oscillator 610 optical axis A–A'. The aperture 618 allows free transmission of the oscillator beam 614 but only the central portion of the residual pump beam 681, which is of large cone angle, is transmitted. The mirror radius of curvature, the mirror position, and the mirror aperture diameter are chosen to reflect the otherwise non-useful part of the residual pump beam back into the amplifier aperture 642 to assist the amplifier pumping, thereby substantially raising the overall laser efficiency.

Since the pump beam 681 exiting the amplifier 640 is highly divergent so that without the mirror 617 a majority of the beam would be lost, the embodiment illustrated by FIG. 6 is very energy efficient.

Since all the components in all the embodiments can be small, the whole laser can be engineered into a very compact, rugged and reliable assembly.

The laser can be operated either with a CW or a quasi-CW pump source, and also with the oscillator Q-switch disabled or removed. Thus the system can be used to generate a CW laser output beam, a beam comprising single or repetitive long (microsecond duration) pulses, as well as the nanosecond pulses illustrated by the embodiments above. The system is particularly attractive for generating either high brightness microsecond or nanosecond pulses. Some further laser materials have substantially the same laser emission wavelength, and also absorb pump power at substantially the same wavelength as those described. Thus the invention is not restricted to the use of the same laser material for the oscillator as for the amplifier. 'Handbook of Laser Wavelengths', Weber MJ, CRC Press NY (1999) lists such materials and their associated laser wavelengths. Both Nd:YAG and Nd:YVO$_4$ have laser emission wavelengths at around 1064.1 nm. The transitions giving rise to these wavelengths in both materials have linewidths of the order 0.5 nm. Both materials can be pumped by a laser diode beam with a wavelength in the region of 800–810 nm. Thus Nd:YAG and Nd:YVO$_4$ is an example of a pair of different materials which can be used together in the laser, another example is Nd:YAG and Nd:Glass.

Operation of a laser using a different laser material in the oscillator from that in the amplifier can improve performance optimisation. For the example of Nd:YAG and Nd:YVO$_4$, the latter crystal material is currently difficult to grow in large pieces (greater than 10–20 mm length) of laser optical quality, and thus a Nd:YVO$_4$ amplifier is restricted to this size. In some cases, Nd:YVO$_4$ has characteristics that make it less suitable than Nd:YAG for amplifying laser pulses, but more suitable for use in the oscillator. In such cases, it is beneficial to use an Nd:YAG amplifier to amplify Nd:YVO$_4$ oscillator pulses. An example is where Nd:YVO$_4$ is preferred in the oscillator to generate the shortest pulses because of its high gain and low energy storage characteristics, and Nd:YAG is preferred as the amplifier to give high energy output pulses because of its lower gain and higher energy storage characteristics.

The foregoing examples, given to help illustrate typical performance that might be achieved by the preferred embodiments, relate to operation of lasers with nanosecond oscillator pulses. However, numerous further examples are possible, and those given are in no way intended to limit the scope of the invention. Equally, much shorter or longer duration optical pulses can be used. For example, operation of a laser with an oscillator producing optical pulses in the picosecond duration range ($10^{-12}$ to $10^{-9}$s) would generate similar gains in pulse energy and peak power, and average output power.

It will be apparent to those skilled in the art, that much higher power laser system scaling, within the scope of the invention and beyond that illustrated, is possible with the increasing availability of suitable higher power laser diodes (both CW and quasi-CW power), and with proper choice of system design parameters, including use, for example, of more than one amplifier, use of an amplifier or amplifiers with significantly larger dimensions and suitable choice of coupling optics and radius of optical amplifier faces to compensate for increased optical lensing effects introduced by the greater thermal load in the laser materials.

It will be apparent to those skilled in the art that alternative optical arrangements exist for system layouts using the invention. For example reflective or diffractive elements rather than refractive elements to manipulate the beams, mirrors to de-couple the amplifier axis from that of the oscillator to provide a folded system, or more than one amplifier, may be used.

Similarly, an optical fibre may be provided to deliver pump energy from a laser diode array to the optical amplifier. In addition, more than one laser diode pump array may be provided.

It will also be apparent to those skilled in the art that, since the laser can generate pulses of high peak and average power and very high brightness, the laser will be a highly efficient and convenient source for generating pulses at other wavelengths (in the visible, UV and IR) by harmonic conversion in non-linear crystals, the pumping of parametric oscillators or the use of Raman shifting devices, for example.

Changes and modifications in the specifically described and illustrated embodiments can be carried out without departing from the spirit and scope of the invention.

The foregoing descriptions of the preferred embodiments of the invention have been presented for the purposes of illustration and description only. They are not intended to be exhaustive or to limit the invention to the precise forms disclosed. Obviously, many modifications and variations will be apparent to practitioners skilled in the art. It is intended that the scope of the invention be defined by the following claims and their equivalents.

What is claimed:

1. A solid state laser comprising an optical oscillator, at least one optical amplifier, a laser diode pump arranged to provide a single pump beam common to both the optical oscillator and the at least one optical amplifier, wherein the pump beam from the laser diode pump is arranged to pass serially through the optical amplifier to produce a pumped optical amplifier before a portion of the pump beam emergent from the optical amplifier pumps the optical oscillator to emit a laser beam and the pumped optical amplifier is arranged to amplify the laser beam.

2. A solid state laser as claimed in claim 1, wherein the optical oscillator and the at least one amplifier are arranged to be end-pumped by the laser diode pump.

3. A solid state laser as claimed in claim 1, wherein said pump beam is focused by focusing means onto an end face of the oscillator and the focusing means is provided with an optical path for the laser beam to pass from the oscillator to an end face of the amplifier substantially unaffected by the focusing means.

4. A solid state laser as claimed in claim 3, wherein the focusing means comprises at least one lens and the optical path comprises an axial bore through the at least one lens.

5. A solid state laser as claimed in claim 3, wherein first reflecting means are included to reflect some of the portion of the pump beam emerging from the amplifier back into the amplifier.

6. A solid state laser as claimed in claim 5, wherein the first reflecting means is a spherical mirror having a axial aperture for the passage of the portion of the pump beam focused by the focusing means onto the oscillator means.

7. A solid state laser as claimed in claim 4, wherein a polariser and a quarter wave plate are located between the focusing means and the optical amplifier such that a linearly polarised beam from the oscillator transmitted through the polariser and quarter wave plate is converted to circularly polarised light before entering the amplifier, and a beam emerging from the amplifier and passing a second time through the quarter wave plate is linearly polarised in a direction orthogonal to the original laser beam, to be reflected by the polariser out of the laser.

8. A solid state laser as claimed in claim 1, wherein the optical amplifier has a truncated conical shape for relaying the portion of the pump beam onto the oscillator.

9. A solid state laser as claimed in claim 8, wherein second reflecting means are provided between the amplifier and the oscillator to reflect a part of the portion of the pump beam back into the amplifier.

10. A solid state laser as claimed in any claim 1, wherein the optical oscillator and optical amplifier have a common optical axis.

11. A solid state laser as claimed in claim 1, wherein the optical oscillator includes a Q-switch.

12. A solid state laser as claimed in claim 1, wherein active materials of the optical amplifier and the optical oscillator are rare earth doped crystals selected from the group consisting of Nd:YAG, Nd:YVO$_4$ and Nd:YLF.

13. A solid state laser as claimed in claim 1, wherein the active materials of the optical amplifier and the optical oscillator are rare earth doped glasses.

14. A solid state laser as claimed in claim 1, wherein the active material of the optical amplifier is selected to be different from the active material of the optical oscillator.

15. A solid state laser as claimed in claim 14, wherein the active materials are Nd:YVO$_4$ and Nd:YAG.

16. A solid state laser as claimed in claim 1, wherein the laser diode pump is one of a CW laser and a quasi-CW laser.

17. A solid state laser as claimed in claim 1, wherein the laser outputs high-power pulses having an energy greater than 100 microjoules.

18. A solid state laser as claimed in claim 1, wherein the laser outputs pulses of less than 500 microsecond duration.

19. A solid state laser as claimed in claim 18, wherein the output pulses are of less than 10 nanosecond duration.

20. A solid state laser as claimed in claim 1, having an output beam substantially in a TEM$_{00}$ mode.

21. A method of producing high energy pulses from a solid state laser comprising the steps of:
   a) providing an optical oscillator and at least one optical amplifier;
   b) providing a laser diode pump common to the optical oscillator and the at least one optical amplifier;
   c) end pumping the at least one optical amplifier by serially passing a single pump beam from the laser diode pump through the optical amplifier to produce a pumped optical amplifier before passing the single pump beam through the optical oscillator to end pump the optical oscillator with the laser diode pump to cause the optical oscillator to emit a laser bean;

d) amplifying the laser beam with the pumped optical amplifier to produce an amplified laser beam; and e) outputting the amplified laser beam from the solid state laser.

* * * * *